United States Patent [19]

Blonder et al.

[11] Patent Number: 4,978,189

[45] Date of Patent: Dec. 18, 1990

[54] HYBRID OPTICAL ISOLATOR, CIRCULATOR OR SWITCH, AND SYSTEMS UTILIZING SAME

[75] Inventors: Greg E. Blonder, Summit; Charles H. Henry, Montgomery Twp., Somerset County; Rudolf F. Kazarinov, Martinsville; Raymond Wolfe, New Providence, all of N.J.

[73] Assignee: AT&T Bell Laboratories, Murray Hill, N.J.

[21] Appl. No.: 436,169

[22] Filed: Nov. 14, 1989

[51] Int. Cl.⁵ ............................................. G02B 5/30
[52] U.S. Cl. ............................. 350/96.12; 350/96.15; 350/96.18; 350/395; 350/407
[58] Field of Search ............... 350/96.11, 96.12, 96.13, 350/96.14, 96.15, 96.18, 96.20, 96.29, 394, 395, 407

[56] References Cited

U.S. PATENT DOCUMENTS

| | | | |
|---|---|---|---|
| 4,019,151 | 4/1977 | Brueckner et al. | 330/4.3 |
| 4,153,328 | 5/1979 | Wang | 350/96.11 |
| 4,221,460 | 9/1980 | Hepner et al. | 350/96.13 |
| 4,671,621 | 6/1987 | Dillon, Jr. et al. | 350/96.29 X |
| 4,691,984 | 9/1987 | Thaniyavarn | 350/96.14 |
| 4,886,332 | 12/1989 | Wolfe | 350/96.12 |

OTHER PUBLICATIONS

I. Yokohama et al, *Electronics Letters*, vol. 22, No. 7, pp. 370–372 (1986), "Polarisation–Independent Optical Circulator . . . ".

*Journal of Lightwave Technology*, K. Drögemüller, vol. 7, No. 2, pp. 340–346 (Feb., 1989).
"Compact Optical Isolator with a Plano–Convex YIG Lens for Laser–to–Fiber Coupling".
"Nonreciprocal Devices in Integrated Optics", J. Castera et al, *Fiber and Integrated Optics*, vol. 8, pp. 71–85, 1989.

*Primary Examiner*—John D. Lee
*Attorney, Agent, or Firm*—M. J. Urbano

[57] ABSTRACT

An optical circulator/isolator is implemented in a semiconductor package formed by a semiconductor substrate, which supports integral thin film waveguide polarization splitters and combiners, and a semiconductor lid, which supports four spherical lenses and a polarization rotator. The latter is a composite of at least two adjacent slabs of optically active material, one slab serving as a nonreciprocal 45° rotator (e.g., a Faraday rotator) and the other as a reciprocal 45° rotator (e.g., half-wave device). The lenses, serving both as beam expanders/condensers and as collimators, are positioned between the waveguide ends and major surfaces of the composite slab. When used with means for reversing the direction of the magnetic field in the nonreciprocal rotator, the device functions also as a switch. Also described are system architectures made possible by these devices; e.g., a single-fiber LAN having a ring architecture for non-interfering counter flow of information and a single fiber, bidirectional FTTH system for handling CATV and POTS.

17 Claims, 9 Drawing Sheets

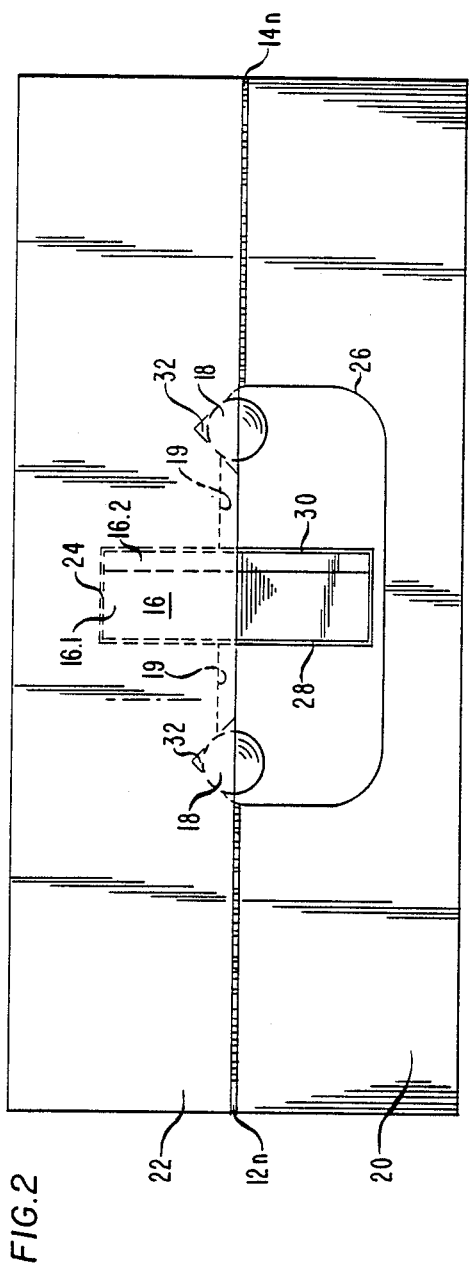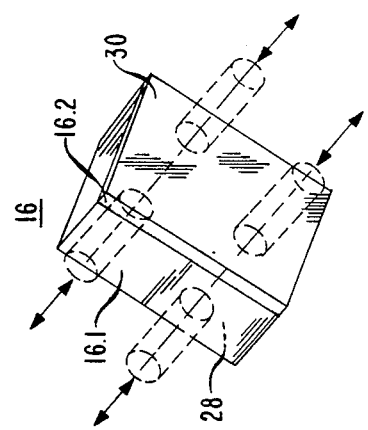

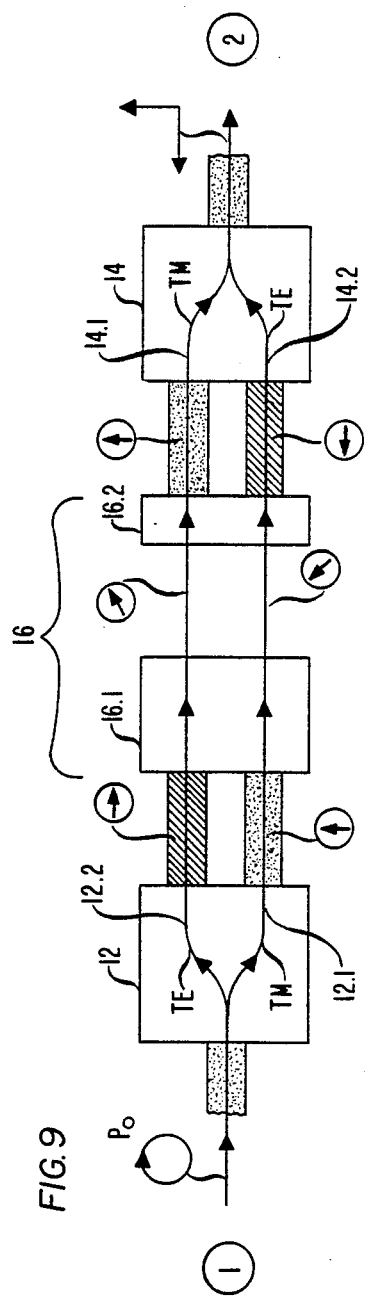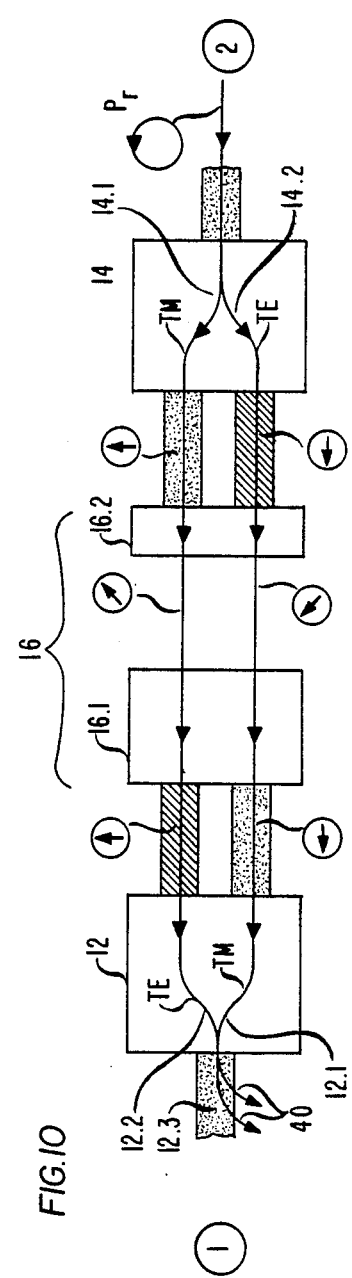
FIG.9
FIG.10

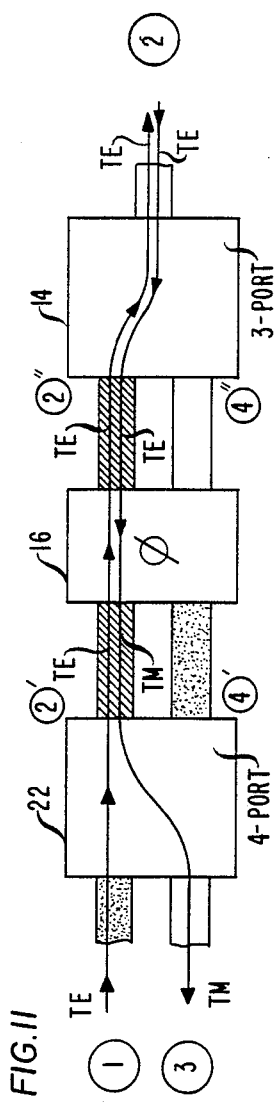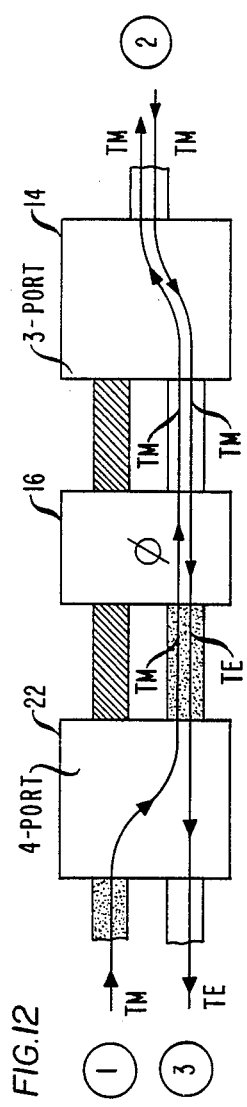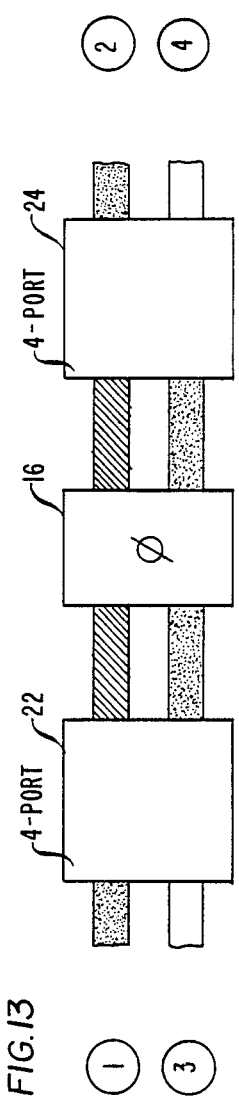
FIG.11
FIG.12
FIG.13

HYBRID OPTICAL ISOLATOR, CIRCULATOR OR SWITCH, AND SYSTEMS UTILIZING SAME

CROSS-REFERENCE TO RELATED APPLICATIONS

This application was concurrently filed with application Ser. No. 07/437,049 (C. H. Henry et al entitled "Adiabatic Polarization Manipulating Device".

BACKGROUND OF THE INVENTION

This invention relates to optical circulators, isolators or switches and to systems incorporating such devices. Of particular interest are hybrid verions of such devices contained within an easily-manufactured subassembly.

With the advent of single mode optical fibers and their rapid acceptance into a variety of actual and proposed optical communications systems (e.g., fiber to the home (FITH), and coherent detection systems), the need for nonreciprocal components, such as optical isolators and circulators, has grown. For these components to be practical they should not only be easily and inexpensively manufacturable but also exhibit low insertion loss at the transmission wavelength(s) and high isolation for unwanted signals (e.g., reflections). Isolation is particularly critical in many systems which are sensitive to spurious reflections. For example, distributed feedback (DFB) lasers tend to be unstable if reflections of the laser output are coupled back into the laser cavity. While expense is important in nearly all applications, it is particularly critical in high volume, low cost projects such as FITH. Isolation and expense are also issues in systems using optical amplifiers where reflections can cause an amplifier to oscillate.

In the past bulk optical circulators and isolators have been proposed, but these components are costly to produce with the required low insertion loss for single mode transmission systems. More recently, some workers in the art have attempted to reduce the number of components by combining the lensing and polarization rotation functions into a single component. The following articles are representative:

I. Yokohama et al, *Electron Letters*, Vol. 22, No. 7, pp. 370-372 (1986) entitled "Polarisation-Independent Optical Circulator Consisting of Two Fiber-Optic Polarising Beam Splitters and Two YIG Spherical Lenses" discloses a single mode circulator in which the lensing and polarization rotation functions are combined in spheres of Faraday rotation material (YIG) and in which a polarization beam splitter/combiner is made of birefringent fiber. Isolation (−18 dB) suffered because the Faraday rotation angle, which is related to optical path length, is a function of whether a light ray passes through the center of the sphere or not. Moreover, insertion loss (2.5 dB) was relatively high and the fiber beam splitters were difficult to fabricate, making the design unsuitable for many of the applications discussed above.

K. Drogemuller, *Journal of Lightwave Technology*, Vol. 7, No. 2, pp. 340-346 (February, 1989) entitled "Compact Optical Isolator With a Plano-Convex YIG Lens for Laser-to-Fiber Coupling" discloses a single mode isolator (for a DFB laser) in which the lensing and polarization rotation functions are combined in a plano-convex body of Faraday rotation material (YIG). A confocal two-lens system is formed by the plano-convex YIG lens and a spherical glass lens. Although isolation of greater than 47 dB was obtained, the system requires a polarizer and critical alignment of the confocal system both of which would increase insertion loss (not reported) and complexity. Moreover, the use of many relatively large components with different expansion coefficients strongly implies a lack of mechanical stability (and component alignment) in environments (e.g., FITH) where wide temperature variations are experienced.

Thus, there remains a need in the art for single mode optical circulators and isolators which have relatively low insertion loss and high isolation, yet can be relatively easily manufactured and can be expected to exhibit good mechanical stability.

SUMMARY OF THE INVENTION

In accordance with a general aspect of the invention, an optical isolator, circulator or switch comprises a pair of polarization splitter/combiners formed by thin film, substrate-supported waveguides and, interposed between the pair, polarization rotation means including adjacent sections of optically active material, one serving as a non-reciprocal 45° rotator (e.g., a magneto-optic rotator) and the other serving as a reciprocal 45° rotator (e.g., a half-wave device). Collimating means is interposed between the splitter/combiners and the sections to insure that each section provides essentially the same amount of polarization rotation (i.e., ±45°) for all rays passing therethrough. To function as a switch the polarization rotator includes means for reversing the direction of the magnetic field applied to the magneto-optic material.

Preferably, the invention is implemented by exploiting the mature processing and equipment technology of the microelectronics industry to form a precision single crystal (e.g., silicon semiconductor) subassembly (e.g., base and lid) for supporting and aligning optical components (e.g., waveguides, lenses, polarization rotators). Fewer dissimilar materials are used to fabricate the components compared to the above-mentioned prior art, and the components themselves are generally smaller (implying smaller lever arms), both of which tend to provide enhanced mechanical stability.

Another aspect of the invention resides in unique system architectures incorporating the optical circulators and switches described above. One architecture is a local area network using a single fiber and optical 4-port switches at each node of a ring to achieve non-interfering bidirectional transmission. Another architecture uses circulators to couple a remote terminal to a distant terminal (e.g., a home) in a fiberoptic transmission system where the circulators enable a single fiber configuration to function in a duplex mode as a dual fiber system would for bidirectional transmission. For example, in a FITH system, the circulator serves as both a coupler and an isolator which enables both video (e.g., cable TV; CATV) and voice (e.g., plain old telephone service; POTS) to be handled using a single fiber between the terminals.

BRIEF DESCRIPTION OF THE DRAWINGS

The invention, together with its various features and advantages, can be readily understood from the following more detailed description taken in conjunction with the accompanying drawing in which, in the interest of simplicity and clarity, the figures have not been drawn to scale;

FIG. 2 is a schematic side view of an embodiment of a circulator/isolator/switch with the semiconductor body of FIG. 1 incorporated into a subassembly in which the body serves as a lid and is mounted on a base; integral waveguides are disposed on the base;

FIG. 3 is a schematic isometric view of the composite slab for polarization rotation shown in FIGS. 1-2.

FIGS. 9-10 are block diagrams of an optical isolator in accordance with one embodiment of the invention using only 3-port polarization devices;

FIGS. 11-12 are block diagrams of an optical circulator in accordance with another embodiment of the invention using both 3-port and 4-port polarization devices;

FIG. 13 is a block diagram of an optical circulator or switch in accordance with yet another embodiment of the invention using only 4-port polarization devices;

DETAILED DESCRIPTION

Figure 1:
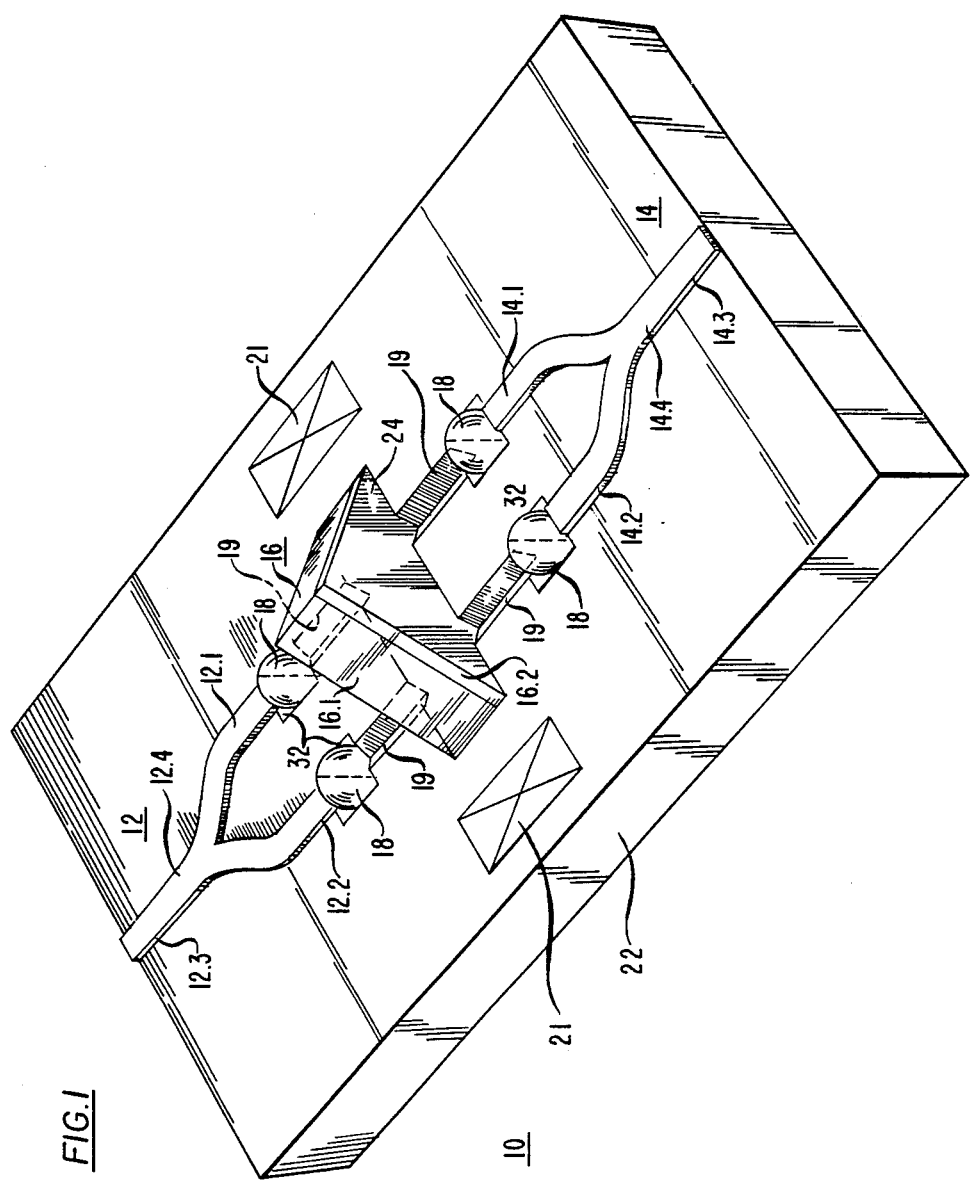
FIG. 1 is a schematic isometric view of a circulator/isolator/switch mounted on a single crystal semiconductor body in accordance with an illustrative embodiment of the invention.

Turning now to FIG. 1, there is shown a circulator, isolator or switch 10 comprising a pair of polarization splitting/combining devices 12 and 14 formed by thin film, substrate-supported optical waveguides, preferably of the adiabatic type described by C. H. Henry et all in the above-identified, concurrently-filed application. In addition, polarization rotation means 16 is interposed between the pair. Means 16 includes adjacent sections 16.1 and 16.2 of optical by active material, one section 16.1 serving as a non-reciprocal 45° rotator (e.g., a magneto-optic (Faraday) rotator) and the other section 16.2 serving as a reciprocal 45° rotator (e.g., a half-wave device). Although sections 16.1 and 16.2 are preferably made in the form of slabs as shown, for ease of manufacture in many applications they may also be made in the form of waveguides. For simplicity, we assume hereinafter that sections 16.1 and 16.2 are slabs.

In the case of a Faraday rotator, means 16 also includes magnetic means 21 for generating a magnetic field essentially parallel to the direction of light propagation through the slab 16.1. For operation as a switch, means 21 also includes the ability to reverse the direction of the magnetic field. Illustratively, means 21 includes a toroidal magnet which surrounds the structure of FIG. 1 (the slab 16.1 in particular). Alternatively, means 21 may comprise thin film or bar magnets located on the structure. These types of magnets are well known in the art.

Collimating means (e.g., spherical lenses 18) is disposed between the splitter/combiners and the slabs to insure that light emerging from the waveguides passes through the slabs as essentially collimated beams. Thus, all light rays have essentially the same optical path length through the slabs and experience essentially the same amount of polarization rotation.

Anti-reflection coatings (not shown) are typically formed on the various components (e.g., slabs 16.1, 16.2; and lenses 18) to reduce reflection losses. In addition, to reduce reflection feedback from within the assembly, the rotation means 16 may be set at a small angle off-normal to the beam direction incident on the rotator and/or the interior ends of the waveguides may be formed at a small angle off-normal to the beam direction in the waveguide.

Before discussing the overall operation of the circulator, isolator or switch, it will be instructive first to define a reciprocal rotator as one in which a given polarization is rotated by some angle $+\theta$ when light propagates in one direction through the rotator and by $-\theta$ when light propagates in the opposite direction. Thus, the rotation is cancelled (i.e., the net rotation is zero) if light having polarization at $+\theta$ is made to pass again through the rotator in the opposite direction.

In constrast, in a non-reciprocal rotator, the rotational effects are cumulative and do not cancel when the propagation direction is reversed. Thus, if a given polarization is rotated by $+\theta$ in one direction, it will be rotated by an additional $+\theta$ for a net rotation of $+2\theta$ when it passes again through the rotator in the opposite direction.

Of particular interest to the present invention is the tandem combination of these two types of rotators; that is, in one direction the rotational effects are cumulative, but in the opposite direction they cancel, as will become apparent in later discussion.

Another area which requires some definition relates to the 3-port and 4-port devices shown in FIGS. 4-7. These devices are described in greater detail in the above-identified application of C. H. Henry et al. A 3-port adiabatic polarization splitting, combining or filtering device is shown in the block diagram of FIG. 4 and in the top view of the waveguide cores of FIG. 5. Briefly, the 3-port device 12 has a first section 12.3 which includes a first waveguide core coupled to port 1, a second section having first and second branches 12.1 and 12.2 which are physically separate and optically decoupled from one another but are coupled to ports 2 and 4, respectively, and a transition section 12.4 where the cores overlap and then gradually separate from one another so as to adiabatically couple the first and second sections to one another. In the transition section the end 12.6 of waveguide 12.2 has an adiabatic taper.

In order to perform the various polarization splitting, combining or filtering functions, device 12 is designed so that, when considering the optical waveguide modes of the "system" (i.e., of the combination of the waveguides viewed as a whole), one branch 12.2 has the highest effective refractive index for the TE mode and the other branch 12.1 has the highest refractive index for the TM mode. To this end, the effective refractive indices n are designed so that those of waveguide 12.2 straddle those of waveguide 12.1; i.e., $n_{TM12.2} < (n_{TM12.1}, n_{TE12.1}) < n_{TE12.2}$.

In operation, a lightwave signal of arbitrary polarization applied to port 1 is split so that essentially only the TM mode appears at port 2 and only the TE mode at port 4. Conversely, TM and TE modes applied to ports 2 and 4, respectively, are combined in the transition section and appear at port 1. But, if the inputs at ports 2 and 4 are reversed, with TE applied to port 2 and/or TM to port 4, then, if the waveguide in the first section 12.3 supports only a single mode, either mode is radiated out of the waveguides in transition section 12.4, and no significant energy propagates to port (i.e., the device functions as a filter). Alternatively, if waveguide in the first section 12.3 supports more than one mode, filtering can be achieved by properly coupling the first section to a single mode device such as a single mode fiber.

Figure 5:
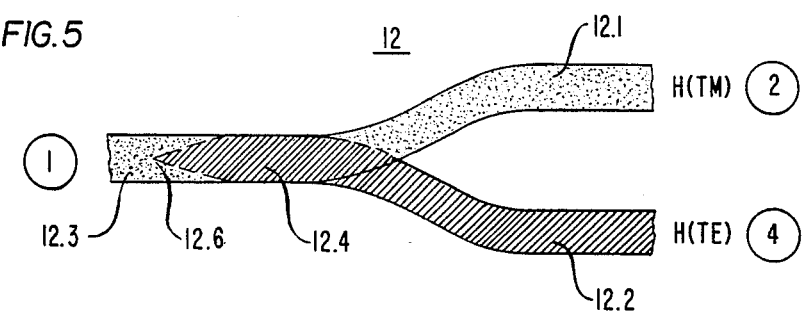
FIG. 5 is a schematic view of a substrate-supported, thin film version of the device of FIG. 4 as described in afore-mentioned, concurrently filed application of C. H. Henry et al, which is incorporated herein by reference.
Figure 6:
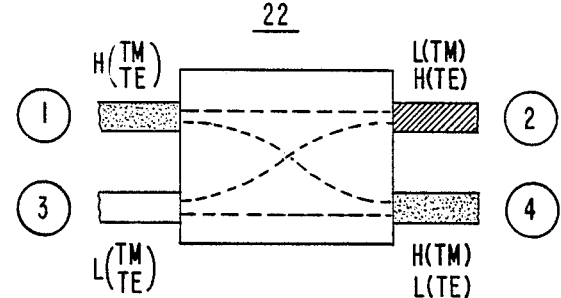
FIG. 6 is a block diagram of a 4-port polarization splitting and combining device useful in implementing certain embodiments of the circulators and switches of the invention such as those shown in FIGS. 11-13.
Figure 7:
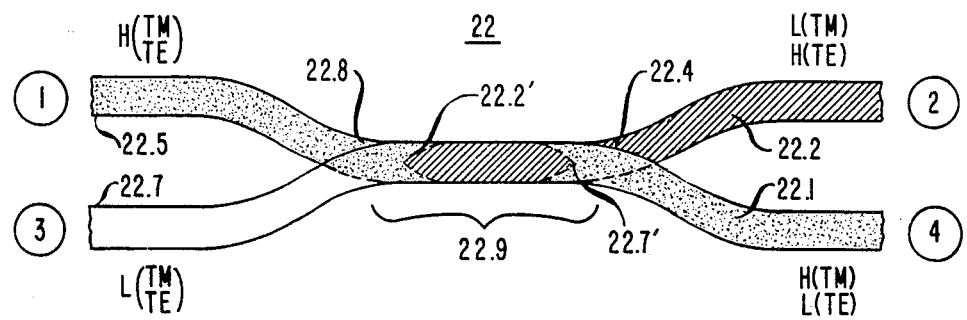
FIG. 7 is a schematic view of a substrate-supported, thin film version of the device of FIG. 6 as described in the afore-mentioned application of C. H. Henry et al.

A similar arrangement is shown in 4-port adiabatic polarization splitting and/or combining device 22 of FIGS. 6–7. In device 22 ports 1, 2 and 4 are analogous in structure and function to those of FIGS. 4–5, but the first section also includes separate waveguide branches 22.5 and 22.7 coupled to ports 1 and 3, respectively, and to a second transition section 22.8. The latter adiabatically couples branches 22.5 and 22.7 to central section 22.9. In section 22.9 the waveguide cores overlap, and both waveguide cores 22.2 and 22.7 terminate in adiabatic tapers 22.2' and 22.7', respectively.

Figure 8:
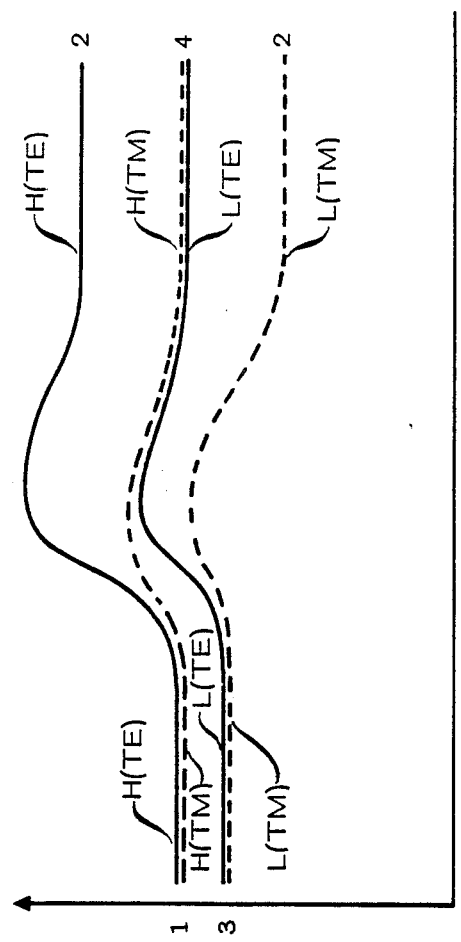
FIG. 8 is a graph showing the effective refractive index in the waveguides of the device of FIGS. 6-7.

The effective refractive indices of the waveguides are designed so that the approximate relationships shown schematically in FIG. 8 are obtained along the length (z) of the device of FIGS. 6–7. The higher (H) and lower (L) refractive index nomenclature of FIGS. 6–8 is defined as follows: (1) any waveguide labeled H excites a fundamental system mode in the central region 22.9, whereas any waveguide labeled L excites a first order system mode; (2) stippled waveguide 22.5 labeled H(TM/TE) has higher refractive indices for both TM and TE than the corresponding modes in unshaded (clear) waveguide 22.7 labeled L(TM/TE); see the left side of FIG. 8; (3) cross-hatched waveguide 22.2 labeled L(TM) and H(TE) has a lower effective refractive index for the TM mode than waveguide 22.1 labeled H(TM) but a higher effective refractive index for the TE mode than waveguide 22.1 also labeled L(TE); see the right side of FIG. 8. Note that H(TM) and H(TE) may be nearly equal as shown. The above-described meanings of the stippled, cross-hatched and unshaded waveguides applies also to the later discussion of FIGS. 9–13, and has been employed in FIGS. 4–5 as well.

This nomenclature is useful in understanding how lightwave signals are routed through the 4-port device. The basic algorithm is as follows: when a signal having a particular polarization (e.g., TE) enters a port labeled H, it will exit from an opposite port also labeled H and supporting the same polarization (i.e., a waveguide designated H(TE)). Conversely, when a signal having a particular polarization enters a port labeled L, it will exit from an opposite port also labeled L and supporting the same polarization. Thus, when a TE signal enters port 4, it is on waveguide 22.1 which is labeled L(TE). This signal will exit from directly opposite port 3 because waveguide 22.7 is labeled L(TM/TE) which includes L(TE) as well as L(TM). Similarly, when a TM mode enters port 4 on waveguide 22.1 labeled H(TM), it propagates through waveguide 22.5 labeled H(TM/TE) and exits from diagonally opposite port 1.

Conversely, if a signal having a TE mode enters port 1, it exits from directly opposite port 2, but a TM mode entering port 1 crosses over and exits from diagonally opposite port 4. Likewise, when a TE mode enters port 3, it exits from directly opposite port 4, but a TM mode entering port 3 crosses over and exits from diagonally opposite port 2. Which mode is made to cross over, as the TM did in the above example, depends on the design and layout of the waveguides. Merely interchanging waveguide 22.1 with 22.2 would cause the TE mode to cross over and the TM to pass straight through.

Consider, now the isolator of FIG. 9 which comprises 3-port polarization splitters/combiners 12 and 14 coupled to polarization rotator 16. For simplicity, rotator 16 is shown as having its reciprocal and nonreciprocal slabs 16.1 and 16.2 separated by a space, whereas in practice the slabs would advantageously abut one another as shown in FIGS. 1–3. An optical signal of arbitrary polarization $P_o$ is applied to port 1 of splitter/combiner 12. $P_o$ represents a signal commonly found in lightwave transmission systems after an initially polarized signal (e.g., from a DFB laser) has propagated for some distance. Splitter/combiner 12 separates the signal into its TM and TE components which propagate on separate waveguides 12.1 and 12.2, respectively. According to the teachings of the above-identified Henry et al application, and as discussed above, waveguide 12.1 has the highest refractive index for the TM mode and waveguide 12.2 has its highest refractive index for the TE mode. To simplify understanding of the figures, such a TM waveguide is shown to be stippled whereas the TE waveguide is cross-hatched. The polarization state is shown by an arrow inside a circle. The separated TE and TM components are directed to Faraday rotator 16.1 which rotates each component by +45°. Thereafter, the components pass through a half-wave plate 16.2 which has its optic axis oriented at 22.5° to the polarization direction. Consequently, in passing through the plate 16.2 the components are each rotated by an additional 45° with the result that upon entering splitter/combiner 14 the TE and TM components have been interchanged. These two components are combined on port 2 of splitter/combiner 14 which, relative to splitter/combiner 12, has its TM waveguide 14.1 and its TE waveguide 14.2 interchanged so as to be able to propagate the modes as interchanged by rotation means 16.

On the other hand, suppose an optical signal of arbitrary polarization $P_r$ is applied to port 2, as shown in FIG. 10. $P_r$ represents a reflected signal commonly created in lightwave transmission systems when a transmitted signal encounters discontinuities in the transmission path (e.g., at connectors). For reasons discussed above, it is undesirable for such a reflected signal to be coupled back to a DFB laser or to an optical amplifier (i.e., to port 1). Thus, after $P_r$ passes through splitter/combiner 14, it is separated into its TE and TM components. These components each experience −45° of rotation imparted by half-wave plate 16.2, but, because the propagation direction is opposite to that of FIG. 9, they each experience +45° of rotation after traversing Faraday rotator 16.1 for a net rotation of zero degrees. Thus, unlike the situation of FIG. 9, the TE and TM modes are not interchanged. The TE component enters TM waveguide 12.1, and likewise the TM component eners TE waveguide 12.2; if waveguide 12.3 is designed to support only a single mode, both will be radiated (arrows 40) out of the waveguide, not propagated through it to port 1. Therefore, essentially no energy from them appears on port 1; i.e., port 1 (and any laser or optical amplifier coupled thereto) is effectively isolated from reflections represented by $P_r$.

Figure 4:
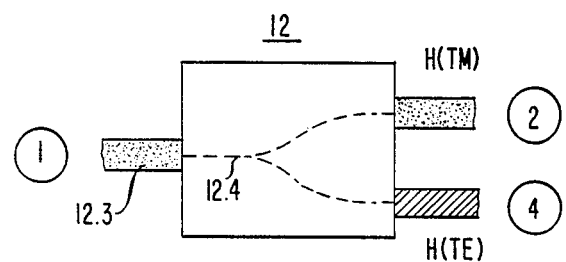
FIG. 4 is a block diagram of a 3-port polarization splitting/combining/filtering device useful in implementing certain embodiments of the isolators and circulators of the invention such as those shown in FIGS. 9-12.

In similar fashion, a 3-port optical circulator is constructed, as shown in FIGS. 11-12, by interposing polarization rotator 16 (shown as a single box for simplicity) between a 4-port polarization splitter/combiner 22 (of the type shown in FIGS. 6-7) and a 3-port polarization splitter/combiner (of the type shown in FIGS. 4-5). In general, the circulator function means that a lightwave signal applied to port 1 exits from port 2, but, in contrast, a signal applied to port 2 exits from port 3, not from port 1. To understand this function suppose a signal having TE polarization is applied to port 1 of splitter/combiner 22; it exits port 2′, experiences no net rotation in traversing rotator 16, enters port 2″ of 3-port splitter/combiner 14, and exits port 2. On the other hand, a TE signal applied to port 2 of 3-port splitter/combiner 14, exits 12″, experiences a net 90° rotation in traversing rotator 16 (thus it is converted from TE to TM), enters port 2′ of splitter/combiner 22 and exits port 3. The analogous situation for TM signals applied to ports 1 or 2 is shown in FIG. 12.

When comparing FIGS. 9-10 with FIGS. 11-12, note that 3-port devices 14 illustratively have TE waveguides (cross-hatched) positioned at different ports. Moreover, rotation means 16 of FIG. 11 produces zero net rotation for TE light propagating from left to right (port 1 to port 2), whereas in FIG. 10 the same is true for TE light propagating from right to left (port 2 to port 1).

Likewise a circulator can be constructed as shown in FIG. 13 by interposing a rotator 16 between a pair of 4-port polarization splitter/combiners 22 and 24. In this embodiment it is assumed that the magnetic field of rotator 16 is directed from left to right. In this case, a signal of either TE or TM polarization applied to port 1 will go straight through and exit port 2, but if applied to port 2 will cross over and exit port 3. On the other hand, this embodiment provides an additional function in that a signal of either TM or TE polarization applied to port 3 will go straight through and exit port 4, but if applied to port 4 will cross over and exit port 1. In contrast, if the same signal were applied to port 3 of FIG. 11, it would be radiated out of 3-port splitter/combiner 14 which has no port 4. Conversely, if the magnetic field direction is reversed, then a signal of either TM or TE polarization applied to port 1 will cross over and exit port 4, but if applied to port 4 will go straight through and exit port 3. Similarly, a signal applied to port 3 will cross over and exit port 2, but a signal applied to port 2 will go straight through and exit port 1. Consequently, being able to reverse the magnetic field direction allows the 4-port device of FIG. 13 to function as a switch; e.g., as a bypass switch as described in the ring architecture of FIGS. 14-15.

Figure 16:
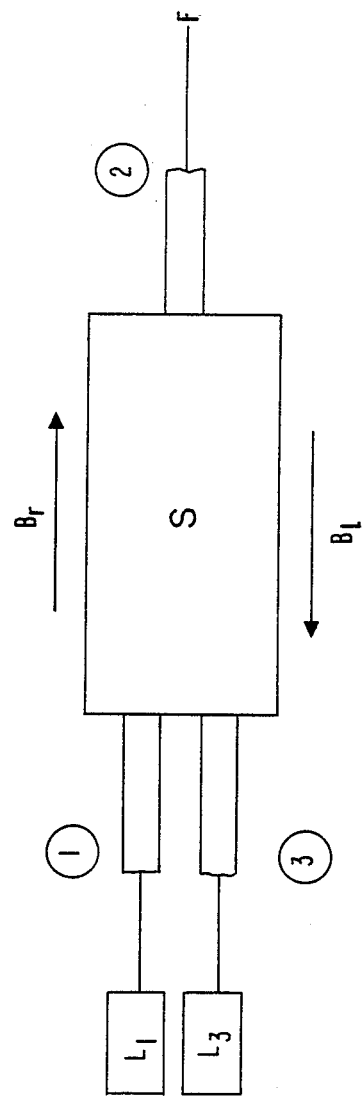
FIG. 16 is a schematic block diagram of the use of the 3-port device described in FIGS. 11-12 as a sparing switch.

Likewise, field reversal in the 3-port devices of FIGS. 11-12 enables them to function as switches; e.g., as a sparing switch as described with reference to FIG. 16.

In a preferred embodiment of the invention, which addresses the issues of high level performance, mechanical/thermal stability and low cost manufacture, the circulator/isolator/switch of FIGS. 1-3 comprises a subassembly formed by base 20 and a lid 22 comprising materials which facilitate precision etching and provide expansion coefficient matching. Typically such materials are single crystals, preferably semiconductors (e.g., Si or Group III-V compounds). Other materials may be useful, however, such as precision molded plastics.

Integral thin film waveguides 12.n and 14.n ($n=1, 2...$) form a pair of polarization splitter/combiners 12 and 14 on either the base or the lid. In FIG. 1 the waveguides appear to be on lid 22, but they are shown there for simplicity—in practice they may be disposed on base 20 as shown in FIG. 2. The base and lid contain various cavities and grooves for supporting and/or aligning the components of the optical circulator/isolator between the output of one splitter/combiner and the input of the other. Polarization rotation means 16 comprises a composite of adjacent slabs 16.1 and 16.2 of optically active material (e.g., a Faraday rotator and a half-wave plate.) The slabs are affixed in a groove 24 in the lid 22 and extend into a wider cavity 26 in the base so that opposite major surfaces 28 and 30 (FIG. 2) of the slabs face the waveguide ends of the splitter/combiners. Spherical lenses 18 are affixed in etched (e.g., pyramidal) wells 32 in the lid 22 and protrude into the cavity 26 in the base. The term spherical is meant to also include spherical segments such as hemispheres. Optional grooves 19 facilitate transmission of light between the lenses 18 and the rotator 16. Depending on the direction of lightwave propagation, the lenses 18 either intercept the light emitted from the interior end of waveguide 12.n and then focus it into essentially collimated beams (FIG. 3) made incident on the major surface 28 of the (Faraday rotator) slab 16.1, or intercept the beams transmitted through the rotation means 16 and emitted from the opposite major surface 30 of the (half wave plate) slab 16.2. In the later case the lenses focus the beams into the waveguides of the combiners/splitters. The converse situation obtains for light emitted from the interior end of waveguide 14.n.

Collimated beam, or adequate approximations of them, can be achieved in several ways without the need for spherical lenses. For example, grin rod lens arrangements known in the art can be substituted for the spherical lens. Alternatively, the ends of the waveguides may be modified to decrease their numerical aperture (NA). One technique to reduce NA is out-diffuse the phosphorus dopant from an end portion of the waveguide; another is to widen and flatten the core of the end portion. In each case the purpose is to make parallel or nearly parallel beams incident on the rotator 16. On the other and, if the rotator 16 is made in the form of integrated waveguides, then lenses can be omitted and the rotator waveguides may be butt coupled to those of the combiner/splitter.

In a practical embodiment, means should also be provided for aligning the base and lid to one another. One technique well known in the art is to form matching detents (e.g., etched pyramidal holes) in the mating surfaces and to insert spheres (e.g., ball bearings) in one set of detents to guide alignment to the matching set.

The adiabatic polarization splitter/combiners 12 and 14 of FIGS. 1 and 5 each comprise two waveguides having cores of different materials and different refractive indices, as previously described. These devices have a first (input/output) section 12.3/14.3 comprising a single waveguide, a second (output/input) section 12.1/12.2 and 14.1/14.2 where the waveguides are physically separate and optically decoupled, and a transition section 12.4/14.4 where the waveguides overlap and then gradually separate so as to adiabatically coupled the first and second sections to one another. Illustratively, in the case of silicon substrate-supported waveguides, waveguides 12.2/14.1, which have the highest effective refractive index for the TE mode, have a silicon nitride core and a silica cladding, whereas waveguides 12.1/14.2, which have the highest refractive index for the TM mode, have a doped silica core and a silica cladding, as taught in the above-mentioned Henry et al application.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

Figure 14:
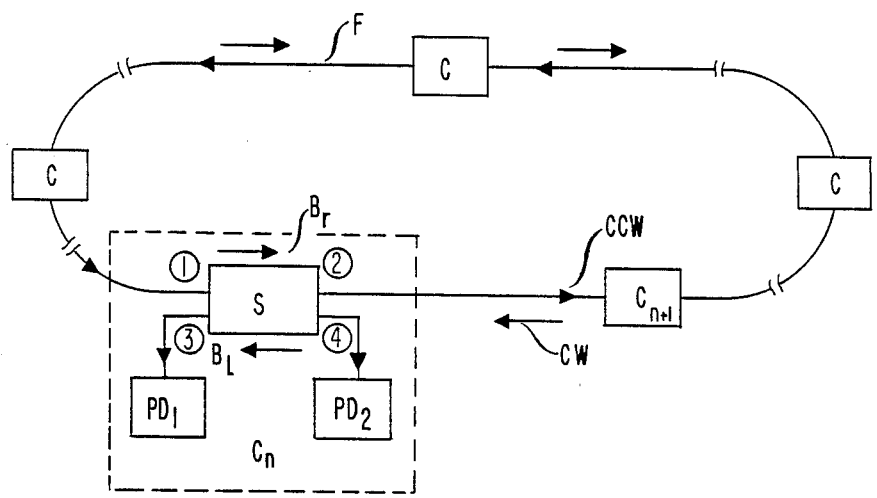
FIGS. 14 and 15 are schematic block diagrams of local area networks in which the 4-port devices described in FIG. 13 are used as bypass switches in a computer ring architecture.
Figure 15:
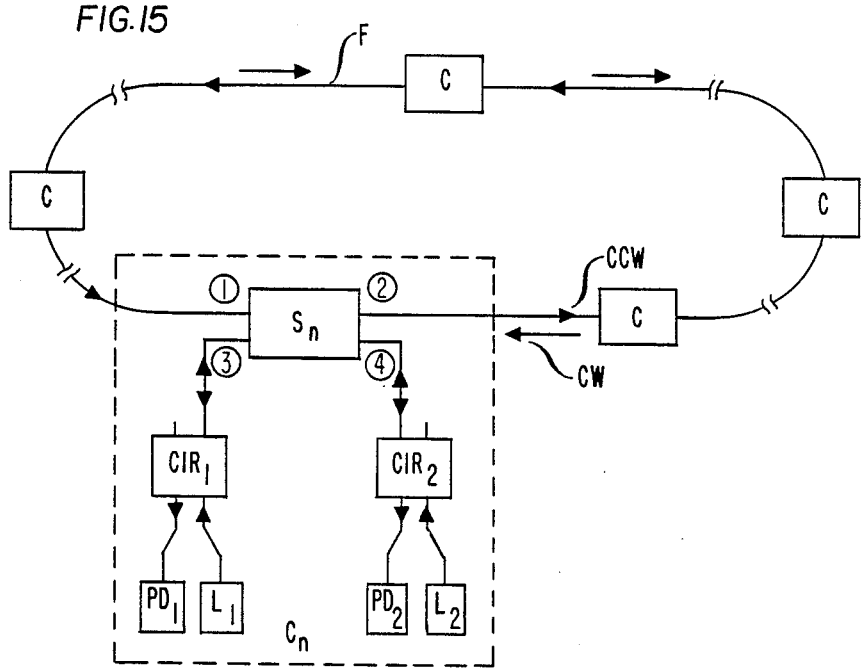

In particular, the switch described in conjunction with FIG. 13 makes possible a local area network (LAN) of the type shown in FIGS. 14 and 15. That is, a plurality n of nodes are interconnected by an optical fiber (F) to form a ring architecture which is characterized by non-interfering counter flow of information. In the simplified version of FIG. 14 each node includes a computer $C_n$, as shown by the block in phantom, which comprises a bypass switch ($S_n$) of the type shown in FIG. 13 and a pair of photodetectors (PDs) along with other standard computer equipment (not shown). In computer $C_n$, when the magnetic field (B) is directed to the right ($B_r$) in switch S, counter clockwise (CCW) flowing information in the ring flows through S from port 1 to port 2 and then on to computer $C_{n+1}$, and no CCW flowing information is received by $PD_2$. Thus, $C_n$ is not listening to CCW flowing information. To listen in, the magnetic field is reversed (directed to the left, $B_l$) so that CCW flowing information does not exit port 2, rather it exits port 4 where it is detected by $PD_2$. The converse situation is true for CW flowing information which either goes straight through S from port 2 to port 1 (field $B_l$) or is switched to port 3 and $PD_2$ (field $B_r$).

In a practical embodiment each computer should have the ability to send signals as well as receive them. To this end, $PD_1$ of FIG. 14 is replaced, as shown in FIG. 15, by the combination of a three-port circulator $CIR_1$, a photodetector $PD_1$ and a light source $L_1$ (e.g., a laser). Likewise, $PD_2$ is replaced by the combination of $CIR_2$, $PD_2$ and $L_2$. Preferably $CIR_1$ and $CIR_2$ are the same type of circulators described previously; i.e., the use of a prior art device might incur a 3 dB loss in each case. The state of the switch S is controlled to enable each computer $C_n$ both to receive and send either CW or CCW flowing information.

This LAN ring architecture utilizing a single fiber effectively doubles the information handling capacity of a unidirectional ring and allows defective nodes to be readily detected.

Another application of the invention combines the functions of a sparing switch and an isolator. As shown in FIG. 16, switch S is a 3-port device of the type shown in FIGS. 11-12 or a 4-port device of the type shown in FIG. 13 with port 4 not being used. In either case, light sources $L_1$ and $L_3$ (e.g., lasers), which can have arbitrary polarization, are coupled to ports 1 and 3 and a utilization device (e.g., fiber F) is coupled to port 2. When the magnetic field is directed to the right ($B_r$), the output of only $L_1$ is coupled to F and $L_1$ is isolted from reflections. Conversely, when the field is to the left ($B_l$), only $L_3$ is coupled to F and $L_3$ is isolated as above. This configuration serves as a sparing switch in that it enables one source to be substituted for the other, e.g., when the first fails to operate properly.

Figure 17:
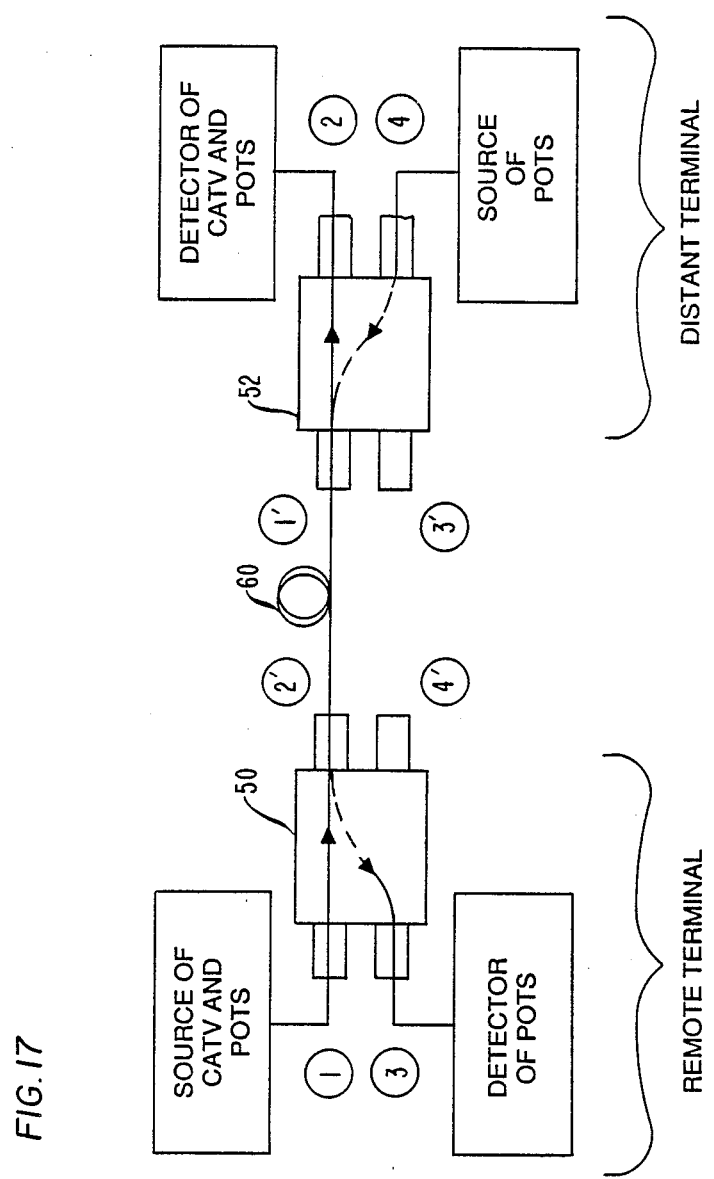
FIG. 17 is a schematic block diagram of an FITH architecture in which 3-port circulators are used to couple CATV and POTS services to a fiber transmission link.

Yet another embodiment of the invention employs the 4-port circulators in an architecture where they function as both isolators and circulators. Only three of the four ports are utilized in the FITH system depicted in FIG. 17, which indicates that 3-port circulators could alternatively be used. In this arrangement, a source of a first signal (e.g., video signals such as analog CATV (at 50–400 MHz)) and a source of a second signal, e.g., voice signals on a carrier not in use by the CATV system (e.g., POTS at 10 MHz), both located at some remote terminal, are coupled to port 1 of upstream circulator 50. The signals from these sources, often lasers, are transmitted through optical fiber 60 to port 1' of downstream circulator 52 which is located at a distant terminal, for example, in a home. The signal exits port 2 which is coupled to a detector of video and voice sigals. On the other hand, a source of voice signals (e.g., analog or digital POTS) in the distant terminal is coupled to port 4 of circulator 52, crosses over to port 1', is transmitted by fiber 60 to port 2' of circulator 50 and crosses over to port 3 of circulator 50 where it is detected by a detector of voice signals.

This system has several advantageous features: (1) with a single fiber, it functions like a two-fiber system using one for video and one for voice signals; (2) it allows transmission at a single wavelength (e.g., 1.3 $\mu$m) in both directions without the 6 dB loss attendant designs which use two 3 dB couplers in place of the circulators; this factor is especially important in CATV systems which are highly sensitive to the signal-to-noise ratio; moreover, because of the power loss savings, a lower performance (hence cheaper) laser could be used; and (3) the circulators themselves provide isolation which means that isolators in the laser packages can be eliminated or lower performance (hence cheaper) isolators could be used there.

We claim:
1. An optical circulator/isolator/switch comprising
   first and second substrate-supported, thin film waveguide means adapted to function as polarization splitters/combiners, and
   polarization rotation means disposed between said first and second waveguide means, said rotation means comprising a non-reciprocal 45° polarization rotator and a reciprocal 45° polarization rotator arranged in tandem,
   whereby light of arbitrary polarization propagating through said circulator/isolator in one direction is split into its TE and TM components by said first waveguide means, the polarization of the components experiences a net rotation of essentially 90° in passing through said rotator and the TE and TM components are re-combined by said waveguide means, but light of arbitrary polarization propagating in the opposite direction is split into its TE and TM components by said second waveguide means, the polarization of the components experiences a net rotation of essentially 0° in passing through said rotator and the TE and TM components are radiated out of said first waveguide means.

2. The circulator/isolator/switch of claim 1 wherein said non-reciprocal rotator comprises a 45° Faraday rotator and said reciprocal rotator comprises a half-wave reciprocal rotator having its optic axis oriented at 22.5° to the direction of one of said polarizations.

3. The circulator/isolator/switch of claim 2 wherein said Faraday rotator and said half-wave rotator each comprises a slab of optical active material, the slabs being joined together along a major surface thereof to form a body having a pair of parallel major surfaces.

4. The circulator/isolator/switch of claim 3 further including means disposed between said waveguide means and said rotation means for collimating light emanating from said first waveguide and making it incident on one of said parallel major surfaces of said body and for focusing light emanating from the other parallel major surface of said body into said second waveguide means, and conversely.

5. The circulator/isolator/switch of claim 4 wherein said collimating means comprises lens means.

6. The circulator/isolator/switch of claim 4 further including
a single crystal semiconductor base on which said first and second waveguide means are integrally disposed, said base having a cavity disposed between said waveguide means,
a single crystal semiconductor lid mounted on said base and having a groove into which said body is affixed, said body extending into said cavity so as to intercept the optical paths between said first and second waveguide means,
said lid having a plurality of wells on opposite sides of said groove, said collimating means comprising a like plurality of spherical lenses each affixed in one of said wells, each of said lenses extending into said cavity so as to intercept the optical paths between said waveguide means and said body.

7. The circulator/isolator/switch of claim 6 wherein said lid has a like plurality of grooves adapted to facilitate coupling of light between said body and said waveguide means.

8. The circulator/isolator/switch of claim 1 wherein each of said waveguide means comprises
a first thin film waveguide having the highest effective refractive index for the TE mode,
a second thin film waveguide having the highest effective refractive index for the TM mode,
a first section which includes one of said waveguides,
a second section where said waveguides are physically separate and optically decoupled from one another, and
a transition section where said waveguides overlap one another and then gradually separate so as to adiabatically couple said first and second sections to one another.

9. The circulator/isolator/switch according to any one of claims 1 through 8 for use as a switch, wherein said polarization means includes means for generating a magnetic field essentially parallel to the direction of light propagation through said non-reciprocal rotator in ombination with means for reversing the direction of said field.

10. The circulator/isolator/switch of claim 9 for use as a sparing switch wherein said waveguides terminate in at least two input ports and at least one output port and further including first and second light sources coupled to separate ones of said input ports and an optical fiber coupled to said at least one output port.

11. The circulator/isolator/switch of claim 10 wherein said sources comprise lasers.

12. A system comprising
a plurality of nodes interconnected by an optical fiber to form a ring architecture for communicating information between said nodes in a clockwise (CW) and/or counter-clockwise (CCW) direction,
each of said nodes comprising a computer which includes,
a switch according to claim 9 wherein said waveguides terminate in at least four optical ports,
said fiber being coupled to two of said ports,
a plurality of photodetectors and a plurality of light sources, and
means for selectively coupling at least one of said photodetectors and at least one of said light sources to each of the two remaining ports of said switch.

13. The system of claim 12 wherein said selective coupling means each comprises a 3-port optical circulator.

14. A system comprising
first and second optical circulators according to any one of claims 1 through 8, said first circulator having a first input port, a first output port and a first input/output port, said second circulator having a second input port, a second output port and a second input/output port,
an optical fiber coupled between said first and second input/output ports,
an optical source of a first-signal coupled to said first input port and a detector of a second signal being coupled to said first output port, and
an optical source of said second signal coupled to said second input port and a detector of said first signal and coupled to said second output port.

15. The system of claim 14 wherein said first circulator is located at a remote terminal and said second circulator is located at a distant terminal such as a home.

16. The system of claim 15 wherein said first signal comprises viewo and voice signals and said second signal comprises voice signals.

17. The system of claim 16 wherein said first signal comprises analog CATV and POTS signals and said second signal comprises an analog or digital POTS signal.

* * * * *